(12) United States Patent
Garrett et al.

(10) Patent No.: US 8,654,942 B1
(45) Date of Patent: Feb. 18, 2014

(54) MULTI-DEVICE VIDEO COMMUNICATION SESSION

(75) Inventors: Maryam Garrett, Boston, MA (US); Glen Shires, Danville, CA (US)

(73) Assignee: Google Inc., Mountain View, CA (US)

(*) Notice: Subject to any disclaimer, the term of this patent is extended or adjusted under 35 U.S.C. 154(b) by 136 days.

(21) Appl. No.: 13/447,374

(22) Filed: Apr. 16, 2012

(51) Int. Cl.
*H04M 11/00* (2006.01)

(52) U.S. Cl.
USPC ...................... 379/93.21; 348/14.08; 704/251

(58) Field of Classification Search
USPC ............... 379/93.21, 158, 202.01; 348/14.08; 704/251

See application file for complete search history.

(56) References Cited

U.S. PATENT DOCUMENTS

| | | |
|---|---|---|
| 7,490,132 B1 | 2/2009 | Lyle et al. |
| 2007/0143103 A1* | 6/2007 | Asthana et al. ............... 704/200 |
| 2007/0188599 A1* | 8/2007 | Kenoyer .................... 348/14.08 |
| 2009/0144297 A1 | 6/2009 | Lyle et al. |
| 2011/0161329 A1 | 6/2011 | Winkler |

* cited by examiner

*Primary Examiner* — Olisa Anwah
(74) *Attorney, Agent, or Firm* — Fish & Richardson P.C.

(57) ABSTRACT

A method of multi-device video communication. A server receives recorded content from a multi-device video communication session and processes the recorded content to detect vocal expressions from a plurality of participants. The server generates a plurality of text elements each corresponding to one or more of the vocal expressions. The server receives at least one rating for at least one participant of the plurality of participants and generates a word cloud based on the plurality of text elements and at least in part on the at least one rating for the at least one participant.

20 Claims, 4 Drawing Sheets

US 8,654,942 B1

MULTI-DEVICE VIDEO COMMUNICATION SESSION

TECHNICAL FIELD

The present disclosure relates in general to multi-device video communication sessions and in particular to using participant ratings in generating word clouds based on a multi-device video communication session.

BACKGROUND

Computing devices such as mobile telephones, tablets, laptops, and desktops have become widely available in recent years. These devices can be equipped with processors, memory, and the capability to communicate through local and wide area networks, including the Internet. These devices can also be equipped with output devices such as displays, image-sensing devices, and sound-sensing devices allowing the device user to record content, display content, and communicate recorded content to other computing devices and other device users. Many device users take part in social networks or video conferencing applications that allow multiple devices to communicate recorded content to each other within the same session, a multi-device video communication session. As participation in multi-device video communication sessions proliferates, device users need a method to represent assessments of the importance of participants within the multi-device video communication session.

SUMMARY

Systems and methods for multi-device video communication are disclosed.

In one implementation, a method of multi-device video communication includes receiving recorded content from a multi-device video communication session and processing the recorded content to detect vocal expressions from a plurality of participants in the multi-device communication session. The method further includes generating a plurality of text elements each corresponding to one or more of the vocal expressions, receiving at least one rating for at least one participant of the plurality of participants, and generating a word cloud based on the plurality of text elements and at least in part on the at least one rating for the at least one participant.

In another implementation, a method of multi-device video communication includes receiving recorded content from a multi-device video communication session having a plurality of participants, receiving a rating of at least one participant of the plurality of participants, and generating a word cloud based on the plurality of text elements and at least in part on the at least one rating for the at least one participant.

In another implementation, a multi-device video communication system is disclosed. The system includes a server configured to communicate with at least one computing device. The server includes a memory and one or more processors wherein the one or more processors are configured to execute instructions stored in the memory to receive recorded content from a multi-device video communication session and process the recorded content to detect vocal expressions from a plurality of participants in the multi-device communication session. The one or more processors are further configured to generate a plurality of text elements each corresponding to one or more of the vocal expressions, receive at least one rating for at least one participant of the plurality of participants, and generate a word cloud based on the plurality of text elements and at least in part on the at least one rating for the at least one participant.

BRIEF DESCRIPTION OF THE DRAWINGS

The description here makes reference to the accompanying drawings where like reference numerals refer to like parts throughout the several views, and where.

DETAILED DESCRIPTION

In the multi-device video communication system and methods described here, a plurality of device users, or participants, can take part in a multi-device video communication session. At least one participant can be given a rating, the rating being provided by one of the other participants, the participant himself, a third party, or by any other method. A word cloud can be generated for the multi-device video communication session based at least in part on the rating for the at least one participant. The rating can act as a weighting factor for text elements within the word cloud in that it can reflect an assessment of the importance of the at least one participant.

Figure 1:
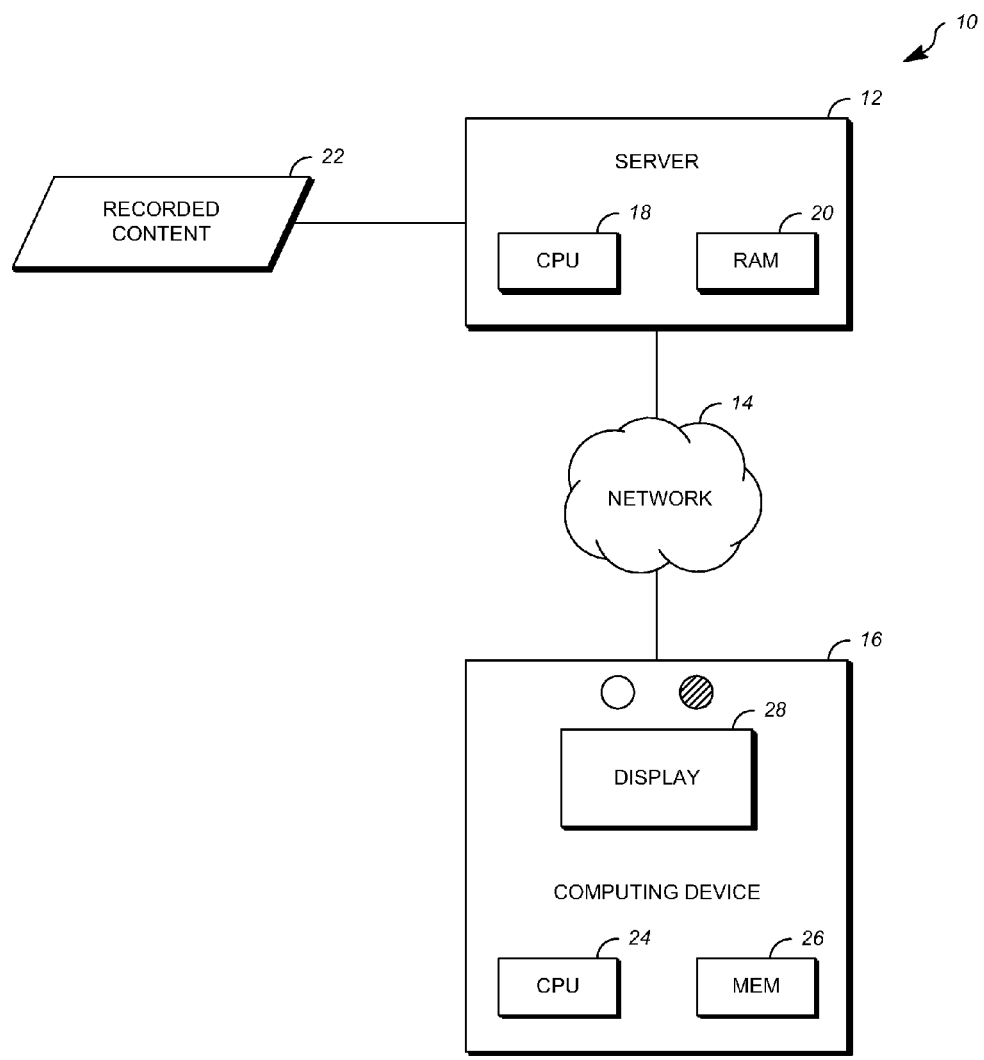
FIG. 1 is a block diagram of a multi-device video communication system.

FIG. 1 is a block diagram of a multi-device video communication system 10 in accordance with one implementation. The system 10 can include a server 12, a network 14, and a computing device 16.

The server 12 can include a processor such as central processing unit (CPU) 18 and a memory 20. In some embodiments, the server 12 can include two or more processors. Further, the server 12 can be implemented on two or more computing devices. In yet other embodiments, the server 12 can be implemented as a distributed system, using multiple computers and/or computing devices. In yet other embodiments, the server 12 can be built on a virtual machine, which itself can run on one or more computers and/or computing devices. The memory 20 can store data and program instructions that are used by the CPU 18. The server 12 can, for example, receive recorded content 22 from a plurality of multi-device video communication sessions as described in one of the below methods and transmit information about the recorded content 22 to the computing device 16 over the network 14.

The network 14 can put the server 12 in communication with the computing device 16 for transmitting information between the server 12 and the computing device 16.

The computing device 16 can include a processor such as CPU 24 and a memory 26. The memory 26 can store data and program instructions that are used by the CPU 24. The computing device 16 can also include or be in communication with one or more output devices, such as display 28. The display 28 can enable a device user of the computing device 16 to view recorded content 22 from multi-device video communication sessions transferred to the computing device 16 from the server 12. An example of the server 12 is further described in FIG. 2.

Figure 2:
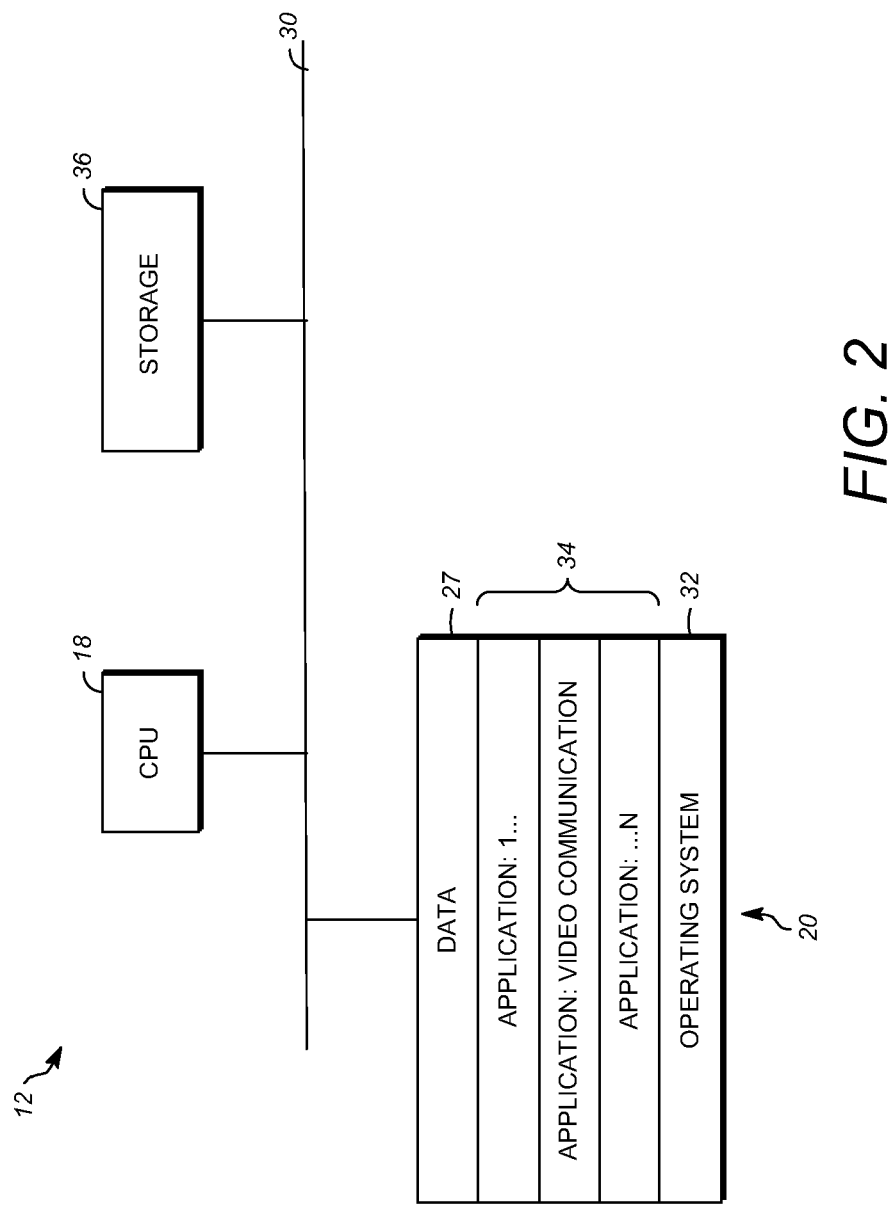
FIG. 2 is a block diagram showing an example of a server.

FIG. 2 is a block diagram of the server 12 of FIG. 1. The server 12 can be in the form of a computing system including multiple computing devices, or in the form of a single computing device, for example, a laptop computer, a notebook computer, a desktop computer, a television with one or more processors embedded therein and/or coupled thereto, and the like.

The CPU 18 in the server 12 can be a conventional central processing unit. Alternatively, the CPU 18 can be any other type of device, or multiple devices, capable of manipulating or processing information now-existing or hereafter developed. Although the disclosed embodiments can be practiced with a single processor as shown, e.g. CPU 18, advantages in speed and efficiency can be achieved using more than one processor.

The memory 20 in the server 12 can be a random access memory device (RAM). Any other suitable type of storage device can be used as the memory 20. The memory 20 can include code and data 27 that is accessed by the CPU 18 using a bus 30. The memory 20 can further include an operating system 32 and application programs 34, the application programs 34 including programs that permit the CPU 18 to perform the methods described here. For example, the application programs 34 can include applications 1 through N which further include a video communication application that performs the methods described here. The server 12 can also include a secondary storage 36, which can, for example, be a memory card or external memory. Because the video communication sessions may contain a significant amount of information, they can be stored in whole or in part in the secondary storage 36 and loaded into the memory 20 as needed for processing.

Although FIGS. 1 and 2 depict the CPUs 18, 24 and the memories 20, 26 of the server 12 and the computing device 16 as being integrated into single units, other configurations can be utilized. The operations of the CPUs 18, 24 can be distributed across multiple machines (each machine having one or more of processors) which can be coupled directly or across a local area or other network. The memories 20, 26 can be distributed across multiple machines such as network-based memory or memory in multiple machines performing the operations of the server 12 and computing device 16. Although depicted here as a single bus, the bus 30 of the server 12 can be composed of multiple buses. Further, the secondary storage 36 can be directly coupled to the other components of the server 12 or can be accessed via a network and can comprise a single integrated unit such as a memory card or multiple units such as multiple memory cards. The server 12 and the computing device 16 can thus be implemented in a wide variety of configurations.

A plurality of computing devices similar to the computing device 16 described in FIG. 1 can communicate with the multi-device video communication system 10 of FIG. 1 and provide recorded content 22 for use in multi-device video communication sessions. Multi-device video communication sessions allow multiple devices to communicate recorded content 22 enabling communication between the device users of the multiple devices. The multi-device video communication system 10 of FIG. 1 can also receive recorded content 22 from any other source. An example multi-device video communication session is described in FIG. 3.

Figure 3:
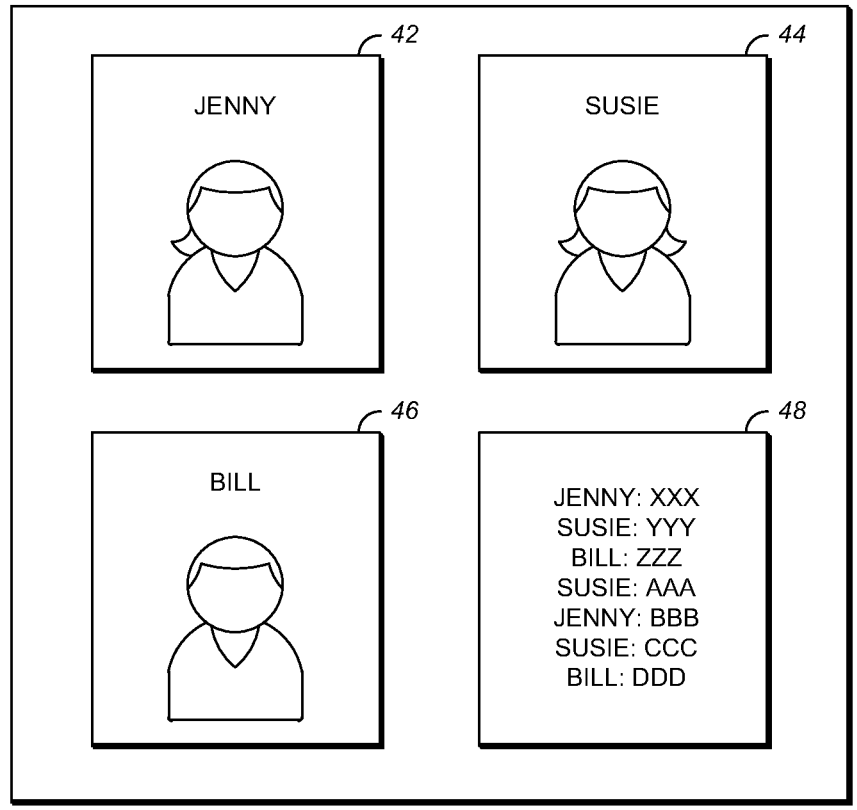
FIG. 3 is an illustration showing an example operation of a multi-device video communication session as displayed on the display screen of a computing device.

FIG. 3 is an illustration showing an example operation of a multi-device video communication session as displayed on the display of a computing device such as computing device 16. Several computing devices can participate in the multi-device video communication session, and content recorded by each computing device can be received by the multi-device video communication system 10 of FIG. 1 for processing and display to the computing devices participating in the multi-device video communication session.

In this example illustration, three device users, Jenny, Susie, and Bill, are participants in a multi-device video communication session, each participating from a separate computing device. Jenny, Susie, and Bill each have computing devices including or in communication with image-sensing devices, sound-sensing devices, and video communication applications. Jenny, Susie, and Bill's computing devices can record content, and the recorded content can include an audio component and a video component.

For example, Jenny, Susie, and Bill can each join the same multi-device video communication session from their respective computing devices through a video communication application. Each computing device can include or be in communication with a camera and microphone capable of recording images and sounds from Jenny, Susie, and Bill, respectively. The multi-device video communication session can be arranged using the recorded content from Jenny, Susie, and Bill and playing it back to the multi-device video communication session participants.

In the example multi-device video communication session shown in FIG. 3, the video component of the recorded content from Jenny's computing device, Jenny's video 42, is displayed in the top left corner. The video component of the recorded content from Susie's computing device, Susie's video 44, is displayed in the top right corner. Finally, the video component of the recorded content from Bill's computing device, Bill's video 46, is displayed in the bottom left corner.

The recorded content from Jenny, Susie, and Bill's computing devices also includes audio content. The recorded audio content can be processed into a transcript for the multi-device video communication session, with each participant identified in the transcript and associated with the text representing speech and other utterances made by the given participant. The transcript can include identifiers for Jenny, Susie, and Bill in the form of their names, or in any other form capable of identifying the source of the recorded audio content. The transcript can also include text associated with the speech and utterances made by Jenny, Susie, and Bill, respectively, during the multi-device video communication session. The transcript can also include time stamps or other devices associated with the text that enable identification of the timing of the speech or utterances, e.g. a time point, made in respect to the rest of the transcript.

The transcript including the processed recorded audio content received from the participants can be displayed within the multi-device video communication session. For example, the transcript 48 can be displayed in the lower right corner of the multi-device video communication session shown in FIG. 3. In some implementations, the transcript 48 is not displayed within the multi-device video communication session. Time stamps or other devices associated with timing of the speech and utterances made by the participants can be included in the transcript 48 and can be used for further processing of the transcript as described below. In some implementations, the time stamps or other devices associated with the timing of the speech and utterances can be included in the display of the transcript 48. A processed version of the transcript 48 including only a portion of the transcript 48 can be displayed within the multi-device video communication session. An example of a processed portion of the transcript 48, a word cloud, is described in FIG. 4.

In another example (not shown), one or more of the device users taking part in the multi-device video communication session can provide only audio content, not video content. For example, one of the device users can be operating a device with a microphone, but no camera. The transcript can still be processed using the recorded audio content received from all of the participants and be displayed within the multi-device video communication session to those participants with video capabilities.

Figure 4:
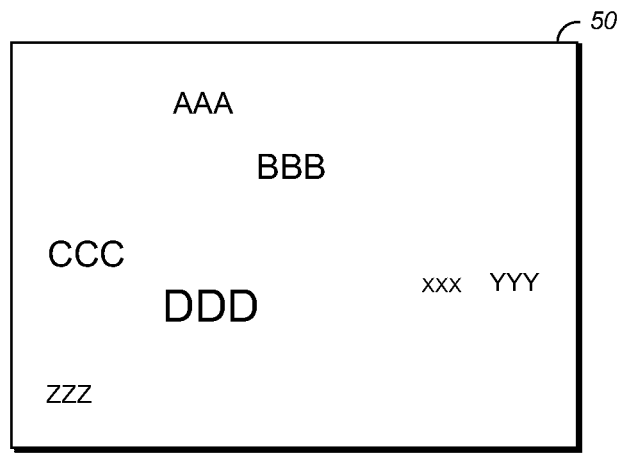
FIG. 4 is an illustration of a word cloud generated from the example multi-device video communication session of FIG. 3.

FIG. 4 is an illustration of a word cloud 50 generated from the example multi-device video communication session of FIG. 3. As described above, the textual transcript 48 generated from the speech and utterances of the participants in the multi-device video communication session can include time stamps or other devices associated with the text enabling identification of the time the speech or utterance occurred within the multi-device video communication session. The text associated with time stamps or other devices identifying timing can be processed for visual representation as a word cloud 50 using factors such as frequency of occurrence of the text, filtering of common text, categorization of text within common topics, confidence level of recognition of the text, the number of different speakers using the text, the popularity of the text in reference to a social media website, the length of the text, or any other factors that allow weighting of text for representation within the word cloud 50.

The processed text from the transcript 48 can be displayed in the word cloud 50 using a variety of formats and techniques including alphabetization, font size differences for emphasis, and color differences for emphasis, or any other format that provides distinction to the text within the word cloud 50. Because text can be associated with time stamps, the content of the word cloud 50 can vary depending on which portion of the transcript 48 is being represented within the word cloud 50. The word cloud 50 can also be displayed as a summary of the transcript 48 as a whole instead of a visualization that changes depending on which portion of the transcript 48 is being represented. The word cloud 50 can also be recorded and replayed at the option of the device user, allowing the device user to review the conversation taking place in the multi-device video communication session.

The word cloud 50 shown in FIG. 4 can be displayed in addition to or in place of the transcript 48 in the multi-device communication session of FIG. 3. The word cloud 50 can be generated from the transcript 48 shown in FIG. 3 and can be alphabetized, with font size used to show weighting of certain text indicating that some text is weighted more heavily than other text depending on a given factor. For example, in the word cloud 50, the text "DDD" and "BBB" is emphasized by the larger size of font as compared to the text "XXX" and "ZZZ."

Word clouds such as word cloud 50 can also use participant rating as a weighting factor. In the method of multi-device video communication described in FIG. 5, at least one rating is provided for at least one participant of the plurality of participants with the at least one rating used as a weighting factor in generating the word cloud 50. Other possible weighting factors for generating and updating the word cloud 50 can include selection of the text for inclusion in the word cloud by one of the participants, correction of the text within the word cloud by one of the participants, and indication that text is important to one of the participants in order to highlight that text within the word cloud 50.

Figure 5:
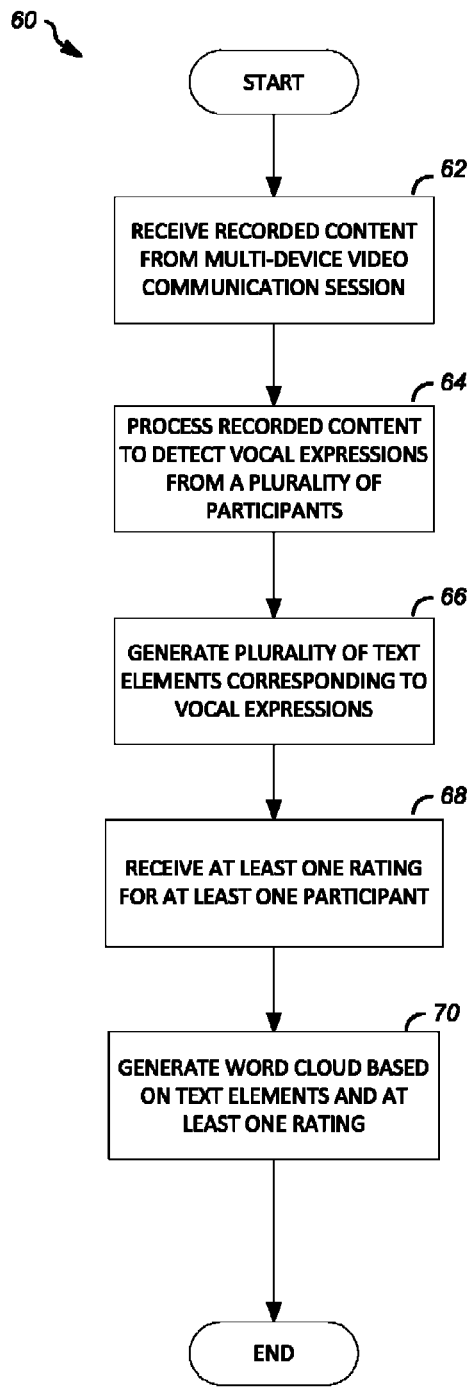
FIG. 5 is a flow chart showing a method of multi-device video communication.

FIG. 5 is a flow chart showing a process 60 of multi-device video communication. In process 60, a plurality of computing devices such as computing device 16 can be in communication with the multi-device video communication system 10 as shown in FIG. 1.

In stage 62, the server 12 can receive recorded content 22 from a multi-device video communication session. For example, the multi-device video communication session shown in FIG. 3 including Jenny, Susie, and Bill as participants can include an audio component and a video component being transmitted to the server 12 for purposes of transmitting the recorded content 22 between Jenny, Susie, and Bill's computing devices.

In stage 64, the server 12 can process the recorded content 22 to detect vocal expressions from a plurality of participants in the multi-device video communication session. Each participant can be identified by the participant's unique audio signature from the audio component of the recorded content 22, the participant's location as identified in the source for the recorded content 22, or by any other method capable of detecting vocal expression and associating the vocal expression with a given participant.

In stage 66, the server 12 can generate a plurality of text elements each corresponding to one or more of the vocal expressions detected from the plurality of participants. For example, a transcript, such as the transcript 48 shown in FIG. 3, can be generated based on the vocal expressions of Jenny, Susie, and Bill as captured in the audio component of their multi-device video communication session. The server 12 can then use the transcript 48 to derive the plurality of text elements and determine the association of the text elements with the plurality of participants within the transcript 48. The server 12 can also associate the text elements with time points within the transcript 48.

Alternatively, the server 12 can receive recorded content 22 already processed by an external device or devices. For example, the server 12 can receive a transcript 48 that can be displayed to the participants of the multi-device video communication session as shown in FIG. 3 or used to identify the multi-device video communication session.

In stage 68, the server 12 can receive at least one rating for at least one participant of the plurality of participants. The rating can represent an assessment of the importance of the at least one participant. An assessment of importance can include the importance of one participant to another participant, the importance of a participant to a general audience, the status of a participant in relation to other participants, or any other assessment that provides a factor for weighting the text elements corresponding to the participant receiving the rating.

For example, a first rating can be sent to the server 12 by a first participant of the plurality of participants in the multi-device video communication session and can represent an assessment of the importance of a second participant of the plurality of participants as viewed by the first participant. As shown in the multi-device video communication session in FIG. 3, Jenny can decide to rate Susie and send that rating to the server 12 for use in processing the recorded content 22 from the multi-device video communication session.

The server 12 can also receive a second rating from a second participant of the plurality of participants. This second rating can represent an assessment of the importance of the first participant. For example, Susie can also rate Jenny and send that rating to the server 12 for use in processing the recorded content 22 from the multi-device video communication session. Additional ratings can also be received by the server 12 from the first and second participants, from additional participants within the multi-device video communication session, or from an outside source.

In stage 70, the server 12 can generate a word cloud, such as word cloud 50 shown in FIG. 4, based on the plurality of text elements and at least in part on the at least one rating for the at least one participant. The word cloud 50 can be based on a weighted list of text elements derived from the transcript corresponding to the audio component of the multi-device video communication session. The word cloud 50 can include a plurality of labels associated with the plurality of text elements, each label having at least one display property based at least in part on the at least one participant rating. The word cloud 50 can give the device user an understanding of the content of the audio component of the transcript 48 of the multi-device video communication session shown in FIG. 3.

For example, in the multi-device video communication session shown in FIG. 3 including Jenny, Susie, and Bill, Jenny can send the server 12 a rating for Susie indicating that Susie has a medium level of importance. The server 12 can take this rating into account in generating the word cloud 50. As another example, Jenny can send the server 12 a rating for Bill indicating that text from Bill should be excluded from the word cloud 50. The server 12 can take this rating into account and exclude text from Bill when generating the word cloud 50. As shown in FIG. 4, the word cloud 50 can include labels associated with text elements based on Susie's vocal expressions, "AAA" and "CCC," in a size that is between the largest and smallest fonts within the word cloud 50, reflecting the medium level of importance that Jenny associates with Susie.

The server 12 can also transmit the word cloud to at least one computing device 16 in the multi-device video communication session for causing the computing device 16 to display a representation of the word cloud to the participant. In addition, the server 12 can receive more than one participant rating and can generate more than one word cloud. Each participant providing at least one rating can receive a word cloud from the server 12 that reflects the at least one rating provided by the participant. For example, Jenny, Susie, and Bill can each receive a different word cloud from the server if they each provide at least one rating of at least one participant in the multi-device video communication session to the server 12. After generation of the one or more word clouds, the process 60 ends.

The embodiments of the server 12 and the computing device 16 (and the algorithms, methods, instructions etc. stored thereon and/or executed thereby) can be realized in hardware including, for example, intellectual property (IP) cores, application-specific integrated circuits (ASICs), programmable logic arrays, optical processors, programmable logic controllers, microcode, firmware, microcontrollers, servers, microprocessors, digital signal processors or any other suitable circuit. In the claims, the term "processor" should be understood as encompassing any the foregoing, either singly or in combination. The terms "signal" and "data" are used interchangeably. Further, portions of server 12 and computing device 16 do not necessarily have to be implemented in the same manner.

In one embodiment, the server 12 and computing device 16 can be implemented using general purpose computers/processors with a computer program that, when executed, carries out any of the respective methods, algorithms and/or instructions described herein. In addition or alternatively, for example, special purpose computers/processors can be utilized which can contain specialized hardware for carrying out any of the methods, algorithms, or instructions described herein.

Further, all or a portion of embodiments of the present invention can take the form of a computer program product accessible from, for example, a non-transitory computer-usable or computer-readable medium. A non-transitory computer-usable or computer-readable medium can be any device that can, for example, tangibly contain, store, communicate, or transport the program for use by or in connection with any processor. The non-transitory medium can be, for example, an electronic device, magnetic device, optical device, electromagnetic device, or a semiconductor device. Other suitable mediums are also available. As an example, the process 60 can take the form of a computer program product that is accessible from the memory 20 of the server 12.

While this disclosure includes what is presently considered to be the most practical and preferred embodiments, it is to be understood that the disclosure is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

The invention claimed is:

1. A method of multi-device video communication, the method comprising:
   receiving recorded content from a multi-device video communication session;
   processing the recorded content to detect vocal expressions from a plurality of participants in the multi-device video communication session;
   generating a plurality of text elements each corresponding to one or more of the vocal expressions;
   receiving at least one rating for at least one participant of the plurality of participants; and
   generating a word cloud based on the plurality of text elements and at least in part on the at least one rating for the at least one participant.

2. The method in claim 1 further comprising:
   transmitting the word cloud to at least one computing device in the multi-device video communication session.

3. The method in claim 1 wherein the recorded content from the multi-device video communication session includes an audio component and a video component.

4. The method in claim 3 wherein processing the recorded content includes generating a transcript corresponding to the audio component of the multi-device video communication session.

5. The method in claim 4 wherein the plurality of text elements are derived from the transcript.

6. The method in claim 1 further comprising:
   associating each text element of the plurality of text elements with one of the participants from the plurality of participants; and
   associating each text element of the plurality of text elements with a time point with respect to the multi-device video communication session.

7. The method in claim 1 wherein the at least one rating represents an assessment of the importance of the at least one participant.

8. The method in claim 1 wherein the word cloud includes a plurality of labels associated with the plurality of text elements, each label having at least one display property based at least in part on the at least one participant rating.

9. The method in claim 1 wherein a first rating is received from a first participant of the plurality of participants and the first rating represents an assessment of the importance of a second participant of the plurality of participants.

10. The method in claim 9 wherein a second rating is received from the second participant of the plurality of participants and represents an assessment of the importance of the first participant of the plurality of participants.

11. A method of multi-device video communication, the method comprising receiving recorded content from a multi-device video communication session having a plurality of participants;

receiving a rating of at least one participant of the plurality of participants; and generating a word cloud based on a plurality of text elements associated with the recorded content and at least in part on the at least one rating for the at least one participant.

12. The method in claim 11 further comprising:

transmitting the word cloud to at least one computing device in the multi-device video communication session.

13. The method in claim 11 wherein the word cloud includes a plurality of labels associated with the plurality of text elements, each label having at least one display property based at least in part on the at least one participant rating.

14. A multi-device video communication system, comprising:

a server configured to communicate with at least one computing device, the server including:

a memory; and one or more processors wherein the one or more processors are configured to execute instructions stored in the memory to:

receive recorded content from a multi-device video communication session;

process the recorded content to detect vocal expressions from a plurality of participants in the multi-device video communication session;

generate a plurality of text elements each corresponding to one or more of the vocal expressions;

receive at least one rating for at least one participant of the plurality of participants; and generate a word cloud based on the plurality of text elements and at least in part on the at least one rating for the at least one participant.

15. The multi-device video communication system in claim 14 wherein the one or more processors are further configured to:

transmit the word cloud to at least one computing device in the multi-device video communication session.

16. The multi-device video communication system in claim 14 wherein the one or more processors are further configured to:

associate each text element of the plurality of text elements with one of the participants from the plurality of participants; and associate each text element of the plurality of text elements with a time point with respect to the multi-device video communication session.

17. The multi-device video communication system in claim 14 wherein the at least one rating represents an assessment of the importance of the at least one participant.

18. The multi-device video communication system in claim 14 wherein the word cloud includes a plurality of labels associated with the plurality of text elements, each label having at least one display property based at least in part on the at least one participant rating.

19. The multi-device video communication system in claim 14 wherein a first rating is received from a first participant of the plurality of participants and the first rating represents an assessment of the importance of a second participant of the plurality of participants.

20. The multi-device video communication system in claim 19 wherein a second rating is received from the second participant of the plurality of participants and represents an assessment of the importance of the first participant of the plurality of participants.

* * * * *